Jan. 18, 1927.

B. F. McGOVERN 1,614,892

TIRE SUPPORTING RIM

Filed Dec. 7, 1923

INVENTOR
BERNARD F. McGOVERN
BY
ATTORNEY

Jan. 18, 1927. 1,614,892
B. F. McGOVERN
TIRE SUPPORTING RIM
Filed Dec. 7, 1923   2 Sheets-Sheet 2

INVENTOR
BERNARD F. McGOVERN
BY
ATTORNEY

Patented Jan. 18, 1927.

1,614,892

UNITED STATES PATENT OFFICE.

BERNARD F. McGOVERN, OF AKRON, OHIO, ASSIGNOR TO THE GOODYEAR TIRE & RUBBER COMPANY, OF AKRON, OHIO, A CORPORATION OF OHIO.

TIRE-SUPPORTING RIM.

Application filed December 7, 1923. Serial No. 679,152.

My invention relates to a device for use in the building of tires, and it has particular relation to a novel type of rim for supporting a tire casing in such manner as to facilitate the manufacture thereof.

One object of my invention is to provide a simple and inexpensive tire supporting rim, which shall eliminate the necessity of the use of a solid core in the finishing and treading operations of the construction of a pneumatic tire casing.

Another object of my invention consists in providing a novel rim which is particularly adapted to permit of stitching the tread by means of machines.

Heretofore, it has been customary to build tires upon solid sectional cores, which building operation included the formation of the carcass, the finishing and the treading operations. The fact that the extremely heavy iron core remained within the tire annulus during the entire operation rendered the handling thereof extremely difficult and inefficient. Repeated handling thereof was necessitated by the fact that the tire is finished and the tread applied on other machines than that on which it is built, on account of the excessive cost of the building machine and the consequent necessity of employing it for as small a portion of the actual construction of the tire as possible.

Another objection to the former method of employing solid cores for all building operations of the tires is the fact that, owing to the large number of such tire casings under course of construction at one time, and the fact that in each of the operations a reserve supply is necessary to insure steady employment of the workmen engaged in each of the three operations, a very large number of such cores was required, thus preventing the use of collapsible metallic cores on account of the excessive cost thereof.

By my invention I have provided a means whereby a tire carcass may be built upon a collapsible solid core on a tire-building machine, and the remainder of the operations, that is, the finishing and treading operations, performed upon a less expensive machine provided with a suitable rim and cooperating pneumatic core for holding such carcass during the remaining building operations, which eliminates the necessity of the solid core.

For a better understanding of my invention, reference may now be had to the accompanying drawings, of which Fig. 1 is an elevational view of one portion of a rim constructed in accordance with my invention and mounted upon a suitable machine.

Figure 1:
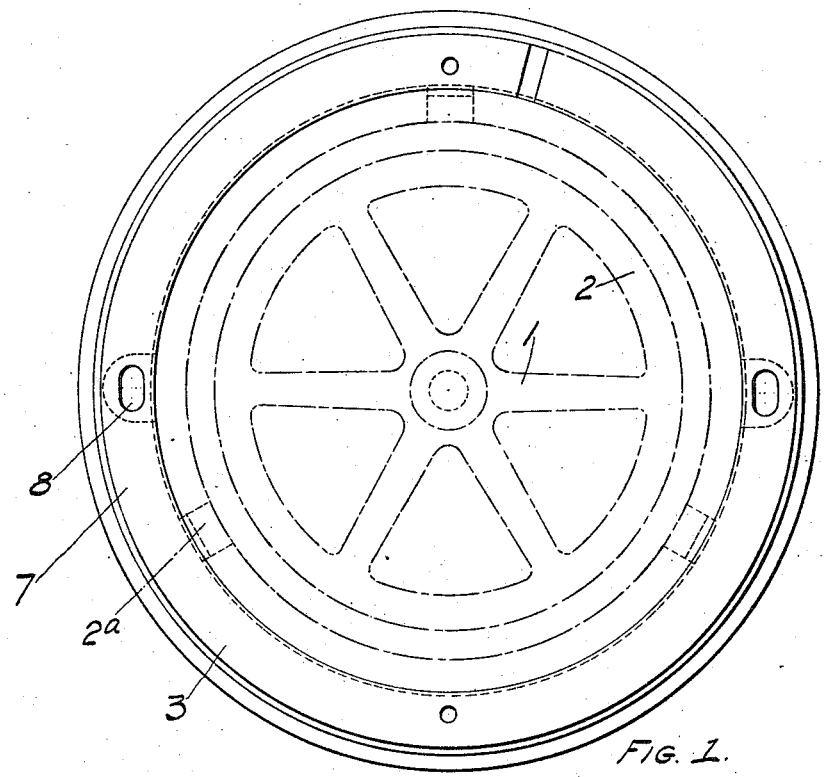
Figure 4:
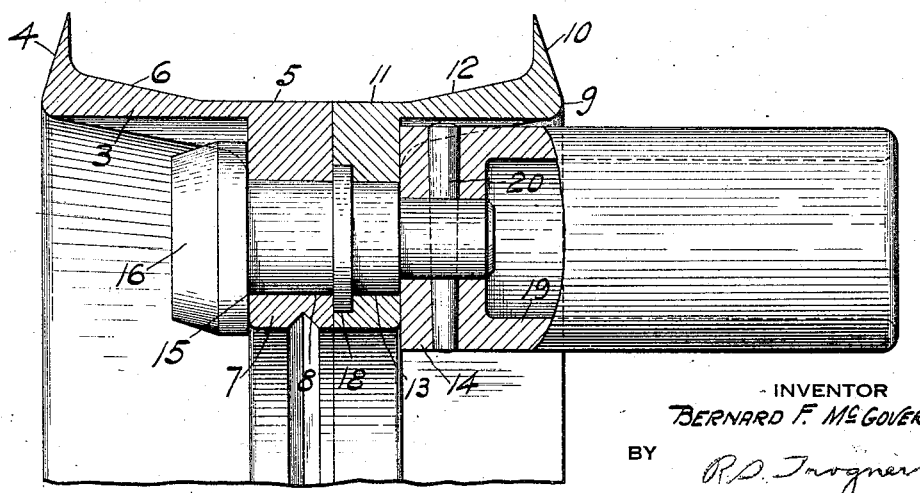
Fig. 4 is a cross-sectional view of an assembled rim embodying my invention.

In the drawings I have shown a machine 1 provided with a rotatable member 2 upon which is permanently mounted a rim member 3 by means of suitable connecting devices 2$^a$. The rim member 3, as best shown in Fig. 4, is provided with a flange 4 adjacent one edge thereof, which is of relatively great diameter, a substantially flat surface 5 adjacent the opposite edge thereof, which is of relatively small diameter, and an intermediate inclined portion 6 interconnecting the flange 4 and surface 5. The smallest diameter of the portion 6 is equal that of the portion 5, and the greatest diameter thereof is greater than that of the portion 5 but less than that of the flange 4. The rim 3 is provided with an inwardly extending annular flange 7 which is provided with two diametrically opposed oblong openings 8, for a purpose to be hereinafter described.

Figures 2, 3:
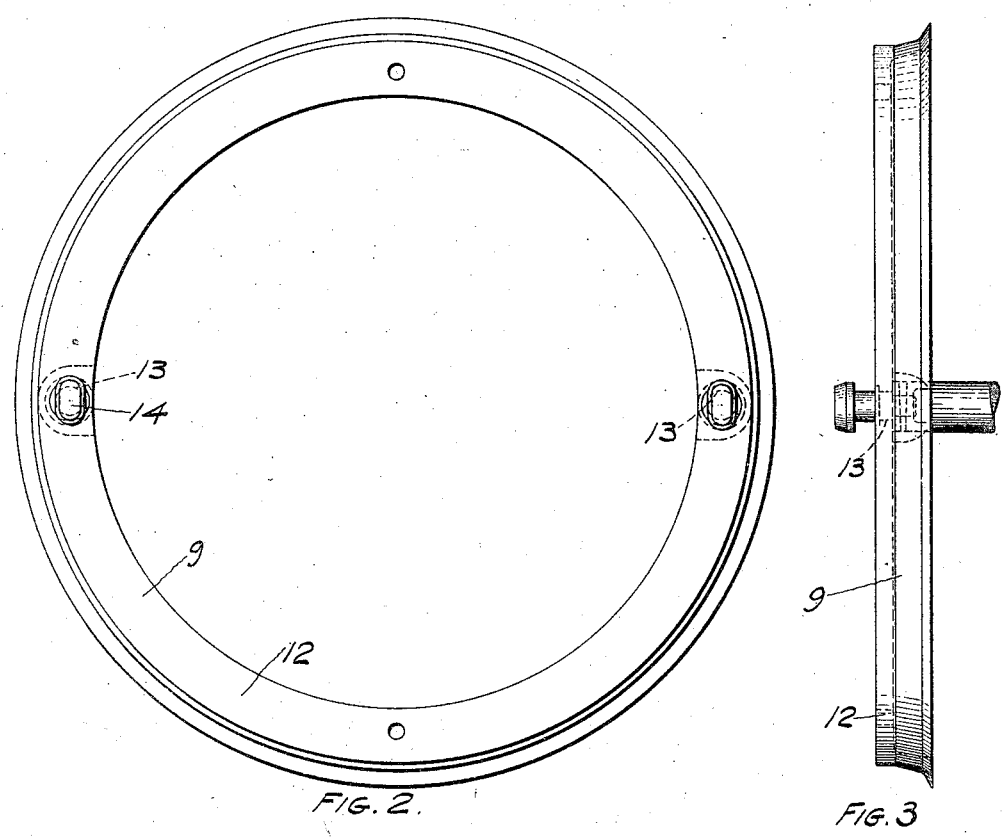
Fig. 2 is an elevational view of a second portion of a rim constructed in accordance with my invention.
Fig. 3 is a side elevational view of the device illustrated in Fig. 2.

A second rim member 9, as best shown in Figs. 2, 3 and 4, is provided with a flange 10, a flat portion 11 and an intermediate portion 12 which correspond in dimensions with the portions 4, 5 and 6 of the rim member 3. The rim member 9 is provided with two diametrically opposite openings 13, within each of which is rotatably mounted a locking device 14. The locking device comprises a rotatable pin 15 which is provided on one end with an oblong head 16 of such contour as to conform to the shape of the openings 8 in the rim 3. The pin is held in position within the flange 10 of the rim 9, by means of a shoulder 18 disposed upon one side, and handle member 19 on the opposite side, which is attached thereto by means of a key 20. The head 16 is turned to the desired position by rotation of the handle 19. The rim is assembled by grasping the two handles 19, picking up the rim 9 thereby, and placing it in juxtaposition to the rim 3 which is mounted upon machine 1. The handles are rotated so as to present the heads 16 of the locking devices 14 to the openings 8 in such manner that they will pass therethrough. After passing therethrough, and, with the rims 3 and 9 held in close contact, the handle 19 is again rotated, causing the head 16 to turn into such position as to lock the rims 3 and 9 together.

Having described the construction of a rim embodying my invention, the operation is as follows. A tire carcass is first built upon a collapsible core, on an ordinary tire-building machine. After the carcass is finished, the core is caused to collapse and the carcass is removed therefrom. It is then transported to the tire finisher who places an air bag within the casing and mounts it upon a rim constructed and supported as described. The side walls, chafing strips and the like, are then added, after which it is removed from the rim and transported to the finisher who adds the tread by means of a rim mounted upon a machine as described.

The rims are of such dimension that the flat portions 5 and 11 are of a smaller diameter than the diameter of the bead of the tire being built. The smaller end of the conical portion 6 is also of smaller circumference than the bead, but the larger end thereof is of equal circumference therewith, and the flanges 4 and 10 are of greater diameter. The flat portions 5 and 11 are made smaller than the bead of the tire in order that it can be readily placed thereon, since the bead surface of a green carcass is neither smooth nor regular, and since it could not be placed upon a rim of equal diameter therewith without great difficulty. In employing this machine, a carcass with an annular air tube inserted therein, is placed upon the flat portion 5 of the rim 3. The rim 9 is then presented thereto and is locked to the rim 3, the bead of the tire extending over the flat portion 11 thereof. Air is then admitted to the tube, forcing the bead to the upper extremities of the inclined portions 6 and 12, and against the flanges 4 and 10, in which position the tire is ready for the finishing and treading operations.

The flanges 4 and 10 are spaced apart a greater width than the rim of the car wheel on which the tire is ultimately intended to be employed. This permits of easier building of the tire, the desired shape being given thereto in the final curing operation. The flanges 4 and 10 are of suitable height to mark the edge to which the side walls should be trimmed.

Figure 5:
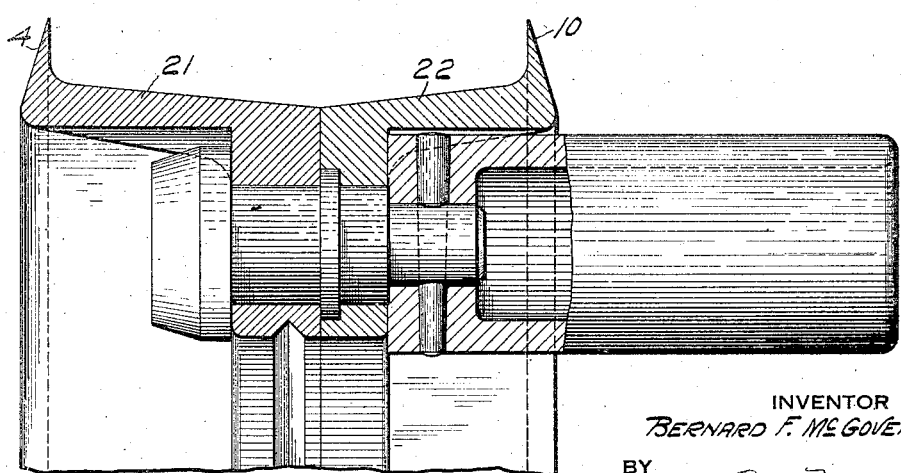
Fig. 5 is a cross-sectional view, similar to Fig. 4, of a modified form of my invention.

In the form of my invention, illustrated in Fig. 5, the flat central portions 5 and 11 have been dispensed with, the inclined portions 21 and 22 extending from the flanges 4 and 10 to the center line of the rim. This modification of my invention operates in the same fashion as that described, except that the bead portions of the tire are placed upon the lower portion of the inclined surface prior to the admission of air to the tube, instead of upon the flat surface as described. Subsequent inflation of the air bag moves the beads into engagement with the flanges 4 and 10, as described in connection with Figs. 1 to 4, inclusive.

From the foregoing description it will be apparent that the necessity of employing solid cores for the finishing and treading operations is eliminated, permitting the use of collapsible cores upon the expensive tire-building machines, thus effecting a saving of time in the building of each tire. Also, the necessity of transporting and handling the extremely heavy iron cores, which could be transported but few at a time, has been dispensed with and the casings alone are moved about, of which a large number may be moved by a single attendant.

Although I have illustrated but two forms of my invention, and have described in detail but a single application thereof, it will be apparent to those skilled in the art that it is not so limited but that various minor modifications and changes may be made therein without departing from the spirit of my invention or from the scope of the appended claims.

What I claim is:

1. The combination with a tire building machine having a rotatable member of an annular tire supporting rim mounted on said member comprising a flange of relatively great diameter adjacent each edge thereof, and an inclined portion adjacent each flange, said inclined portion being of greatest diameter adjacent the flange.

2. The combination with a tire building machine having a rotatable support of an annular tire supporting rim fitted upon said support comprising a central portion of relatively small diameter, inclined portions disposed on each side of the central portion, and flanges of relatively great diameter disposed at the outer edge of the inclined portions.

3. A tire supporting rim adapted to be supported upon a rotatable member comprising two substantially similar annular members adapted to be fastened together in side-by-side relation, each of said members comprising a flange portion of relatively great diameter adjacent one edge thereof, a portion of relatively small diameter adjacent the opposite edge, and an inclined intermediate portion of relatively great diameter adjacent the flange and of relatively small diameter adjacent the opposite edge.

4. A tire supporting rim comprising two substantially similar annular members, one of said members being adapted to be mounted upon a rotatable support, and means for securing the other member thereto comprising a plurality of handles attached thereto and provided with means for locking the members together.

5. A tire supporting rim comprising two substantially similar annular members, one of said members being adapted to be mounted upon a rotatable support, and provided with a plurality of openings, and means for securing the other member thereto comprising a plurality of handles rotatably mounted thereon and provided with means adapted to pass through the said openings and lock the members together.

6. A tire supporting rim adapted to be rotatably mounted comprising an annular member formed with an aperture of oval contour, a substantially similar member also formed with an aperture therein and adapted to be positioned on the first member with the apertures in registry, and means to secure the members to each other consisting of headed pins adapted to be disposed in the apertures and operating handles attached to said pins and adapted to project from the side of the rim.

In witness whereof, I have hereunto signed my name.

BERNARD F. McGOVERN.